United States Patent
Crain et al.

(10) Patent No.: US 10,647,324 B2
(45) Date of Patent: May 12, 2020

(54) SYSTEMS AND METHODS FOR CONTROL OF TWO INDEPENDENT POWERTRAINS IN A VEHICLE

(71) Applicant: Polaris Industries Inc., Medina, MN (US)

(72) Inventors: Stephen G. Crain, Wyoming, MN (US); Peter J. Erasmus, Mellingen (CH); David F. Buehler, Pieterlen (CH); Markus Hoffet, Aarberg (CH); Kevin P. Blair, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 242 days.

(21) Appl. No.: 15/278,926

(22) Filed: Sep. 28, 2016

(65) Prior Publication Data

US 2018/0086343 A1 Mar. 29, 2018

(51) Int. Cl.
*B60W 30/00* (2006.01)
*B60W 30/188* (2012.01)
(Continued)

(52) U.S. Cl.
CPC ............. *B60W 30/188* (2013.01); *B60K 1/00* (2013.01); *B60K 1/02* (2013.01); *B60K 1/04* (2013.01);
(Continued)

(58) Field of Classification Search
None
See application file for complete search history.

(56) References Cited

U.S. PATENT DOCUMENTS 7,228,927 B2   6/2007  Hass et al.
9,758,040 B1 *  9/2017  Reid ................ B60K 28/10
(Continued)

FOREIGN PATENT DOCUMENTS

DE   102008019656 A1   10/2009
DE   102008020555 A    10/2009
(Continued)

OTHER PUBLICATIONS

Written Opinion of the International Searching Authority, European Patent Office, PCT/US2017/053883, dated Feb. 13, 2018, 10 pages.
(Continued)

*Primary Examiner* — James M McPherson
(74) *Attorney, Agent, or Firm* — Faegre Drinker Biddle & Reath LLP

(57) ABSTRACT

Vehicles including a plurality of front and rear ground engaging members, a front driveline operatively coupled to a first power source, a rear driveline operatively coupled to a second power source, at least one controller operatively coupled to the first drive system and the second drive system are disclosed. The vehicles may further include a torque request input adapted to be actuatable by an operator of the vehicle. The torque request input may provide an indication of a requested torque to the at least one controller. The at least one controller may, based on the requested torque, command a first output of the first drive system to the at least one front ground engaging member and a second output of the second drive system to the at least one rear ground engaging member. Vehicle drive control systems are also disclosed. Methods of controlling torque and battery management are also disclosed.

42 Claims, 11 Drawing Sheets

(51) Int. Cl.
*B60K 1/04* (2019.01)
*B60K 17/356* (2006.01)
*B60K 1/02* (2006.01)
*B60W 10/08* (2006.01)
*B60W 10/26* (2006.01)
*B60W 50/00* (2006.01)
*B60K 1/00* (2006.01)
*B60K 17/354* (2006.01)
*B60W 30/18* (2012.01)
*B60L 58/20* (2019.01)

(52) U.S. Cl.
CPC .......... *B60K 17/354* (2013.01); *B60K 17/356* (2013.01); *B60L 58/20* (2019.02); *B60W 10/08* (2013.01); *B60W 10/26* (2013.01); *B60W 30/18* (2013.01); *B60W 30/18127* (2013.01); *B60W 50/0098* (2013.01); *B60K 2001/001* (2013.01); *B60K 2001/0422* (2013.01); *B60K 2001/0433* (2013.01); *B60L 2220/42* (2013.01); *B60L 2240/421* (2013.01); *B60L 2240/423* (2013.01); *B60W 2050/0056* (2013.01); *B60W 2300/185* (2013.01); *B60W 2510/083* (2013.01); *B60W 2510/18* (2013.01); *B60W 2510/244* (2013.01); *B60W 2520/10* (2013.01); *B60W 2540/10* (2013.01); *B60W 2710/083* (2013.01); *B60W 2710/242* (2013.01); *B60W 2720/403* (2013.01); *B60Y 2200/20* (2013.01)

(56) References Cited

U.S. PATENT DOCUMENTS

| 2009/0156068 | A1 | 6/2009 | Barrett et al. | |
| 2016/0129911 | A1* | 5/2016 | Takahashi | B60W 30/18172 |
| | | | | 701/22 |
| 2017/0183008 | A1* | 6/2017 | Isono | B60L 11/14 |
| 2017/0203661 | A1* | 7/2017 | Nishinaka | B60L 11/1816 |
| 2017/0232848 | A1* | 8/2017 | Lian | B60L 3/00 |
| | | | | 701/22 |
| 2017/0253230 | A1* | 9/2017 | Yamamoto | B60W 20/14 |
| 2017/0259805 | A1* | 9/2017 | Yamamoto | B60W 20/13 |
| 2017/0282894 | A1* | 10/2017 | Kamachi | B60W 20/13 |
| 2017/0302216 | A1* | 10/2017 | Ide | B60L 3/003 |
| 2018/0043881 | A1* | 2/2018 | Hirasawa | B60W 20/13 |

FOREIGN PATENT DOCUMENTS

| EP | 1564518 A1 | 8/2005 |
| WO | WO2011151936 A1 | 12/2011 |
| WO | WO 2018/064258 | 4/2018 |

OTHER PUBLICATIONS

International Search Report, European Patent Office, PCT/US2017/053883, dated Feb. 13, 2018, 7 pages.

International Preliminary Report on Patentability issued by the International Preliminary Examining Authority, dated Jan. 22, 2019, for International Patent Application No. PCT/US2017/053883; 22 pages.

* cited by examiner

SYSTEMS AND METHODS FOR CONTROL OF TWO INDEPENDENT POWERTRAINS IN A VEHICLE

FIELD OF THE DISCLOSURE

This disclosure relates to vehicles. More specifically, this disclosure relates to systems and methods for control of two independent powertrains in a vehicle.

BACKGROUND

Generally, vehicles, such as all-terrain vehicles ("ATVs") and utility vehicles ("UVs") are used to carry one or more passengers and cargo over a variety of terrain. Some ATVs and UVs may include side-by-side seating, in which a passenger may be seated next to the driver at the front of the vehicle. Side-by-side vehicles also may include a rear seating area to accommodate additional passengers in the vehicle. An upper frame assembly may be provided over the seating area(s) of the vehicle. Additionally, ATVs and UVs may have a powertrain to deliver power to ground-engaging members. Exemplary ground engaging members include tires, skis, or any other device for moving the vehicle across the ground. Powertrains may include various types of motors, such as combustion driven motors and/or electric motors.

SUMMARY

The present disclosure provides systems and methods for control of two independent powertrains in a vehicle. The systems and methods may reduce or minimize electrical power losses and mechanical losses during operation of a vehicle.

In an exemplary embodiment of the present disclosure, a vehicle including a plurality of ground engaging members, including at least one front ground engaging member and at least one rear ground engaging member, a frame supported by the plurality of ground engaging members, a first drive system supported by the frame, the first drive system including a first power source and a front driveline operatively coupled to the first power source and the at least one front ground engaging member to communicate power from the first power source to the at least one front ground engaging member, a second drive system including a second power source supported by the frame and a rear driveline operatively coupled to the second power source and the at least one rear ground engaging member to communicate power from the second power source to the at least one rear ground engaging member, at least one controller operatively coupled to the first drive system and the second drive system and a torque request input adapted to be actuatable by an operator of the vehicle, the torque request input providing an indication of a requested torque to the at least one controller, wherein the at least one controller based on the requested torque, commands a first output of the first drive system to the at least one front ground engaging member and a second output of the second drive system to the at least one rear ground engaging member, the first power source is an electrical power source supplied by a first power storage system, and the second power source is an electrical power source supplied by a second power storage system is provided.

In some embodiments of the present disclosure, the first power storage system and/or the second power storage system may be a battery bank. The battery cell type of the first battery bank may have a different chemical composition from the second battery bank. For example, the battery cell type of the first battery bank may lithium-ion and the battery cell type of the second battery bank may be lead-acid.

The vehicle may also include a front brake operatively coupled to the first power source, wherein the front brake is configured to charge the first power source with energy produced through regenerative braking.

The controller may determine the first output of the first drive system and the second output of the second drive system based on at least one of a total torque command or a speed of the vehicle. Also, the controller may determine the first output of the first drive system and the second output of the second drive system based on a state of charge of at least one of the first power source or the second power source. Additionally, the controller may determine the first output of the first drive system and the second output of the second drive system based on a braking command. Furthermore, the controller may determine the first output of the first drive system and the second output of the second drive system based on an electrical capacity of the first drive system.

In another exemplary embodiment of the present disclosure, a vehicle drive control system for a vehicle having a first drive system including a first power storage system and a second drive system including a second power storage system is provided. The vehicle drive control system may include at least one controller configured to receive a torque input command, receive at least one vehicle characteristic, provide a first torque output command to the first drive system to provide a first torque output, and provide a second torque output command to the second drive system to provide a second torque output, a first connector operably coupled to the controller and adapted to be operably coupled to a first communication network connecting the first drive system to the at least one controller, and a second connector operably coupled to the controller and adapted to be operably coupled to a second communication network connecting the second drive system and the at least one controller.

The controller may be further configured to receive an indication of a state of charge of the first battery bank of the first drive system and an indication of a state of charge of the second battery bank of the second drive system and to alter at least one of the first torque output command or the second torque output command based on a charge difference between the state of charge of the first battery bank and the state of charge of the second battery bank being greater than a predetermined threshold. The predetermined threshold may be a percent charge difference, which may be greater than about 10%, greater than about 7.5%, or greater than about 5%.

The controller may be configured to receive the torque input command from at least one of an accelerator pedal or a brake pedal. The controller may also have a low-pass filter configured to alter at least one of the first torque output command or the second torque output command. The first torque output command may be from 0% to 100% of a total torque command or may be between about 20% to about 80% of a total torque output command comprising the first torque output command and the second torque output command, may be between about 20% to about 60% of the total torque output command, may be between about 40% to about 80% of the total torque output command, may be between about 40% to about 60% of the total torque output command may be between about 50% to about 60% of the total torque output command, or may be about 54% of the total torque output command.

The first torque output command and the second torque output command may be determined to minimize the loss of power between the first power storage system, the second power storage system, and a travel surface. For example, a vehicle having the vehicle drive control system may include a front driveline operatively coupled to the first battery bank and the second drive system of the vehicle may include a rear driveline operatively coupled to the second battery bank. The controller may in electrical communication with the first drive system and the second drive system, and the front driveline and the first battery bank may be independent of the rear driveline and the second battery bank. Thus, the controller may be configured to minimize the electrical power loss and the mechanical power loss.

In yet another exemplary embodiment of the present disclosure, a method of controlling a torque output of a vehicle having a front driveline coupled to at least one front ground engaging member and a rear driveline coupled to at least one rear ground engaging member is provided. The method may include receiving a torque request command and a signal indicating a speed of the vehicle, determining, by at least one controller, a front torque output for the front driveline and a rear torque output for the rear driveline, controlling, by the at least one controller, an electrical output of a first battery power system based on the front torque output for the front driveline, supplying the electrical output of the first battery power system to the front driveline, controlling, by the at least one controller, an electrical output of a second battery power system based on the rear torque output for the rear driveline, and supplying the electrical output of the second battery power system to the rear driveline.

The method may also include receiving a brake command, determining, by the at least one controller, a braking torque split between the front driveline and the rear driveline, controlling the front braking of the front driveline. The determination step may include determining a first front torque output and a first rear torque output to reduce power loss by at least one of the front driveline, the rear driveline, the first battery system, the second battery system or mechanical power losses, and receiving a state of charge of the first battery system and a state of charge of the second battery system, and determining a second front torque output and a second rear torque output based on the state of charge of the first battery system, the state of charge of the second battery system, a power loss cost associated with operating the first power storage system and the front driveline at the second front torque instead of the first front torque, and a power loss cost associated with operating the second power storage system and the rear driveline at the second rear torque instead of the first rear torque.

The method may also include recharging the first power storage system with regenerative braking while controlling the front braking of the front driveline.

BRIEF DESCRIPTION OF THE DRAWINGS

The above mentioned and other features and objects of this disclosure, and the manner of attaining them, will become more apparent and the disclosure itself will be better understood by reference to the following description of exemplary embodiments of the disclosure taken in conjunction with the accompanying drawings, wherein.

Figure 1A:
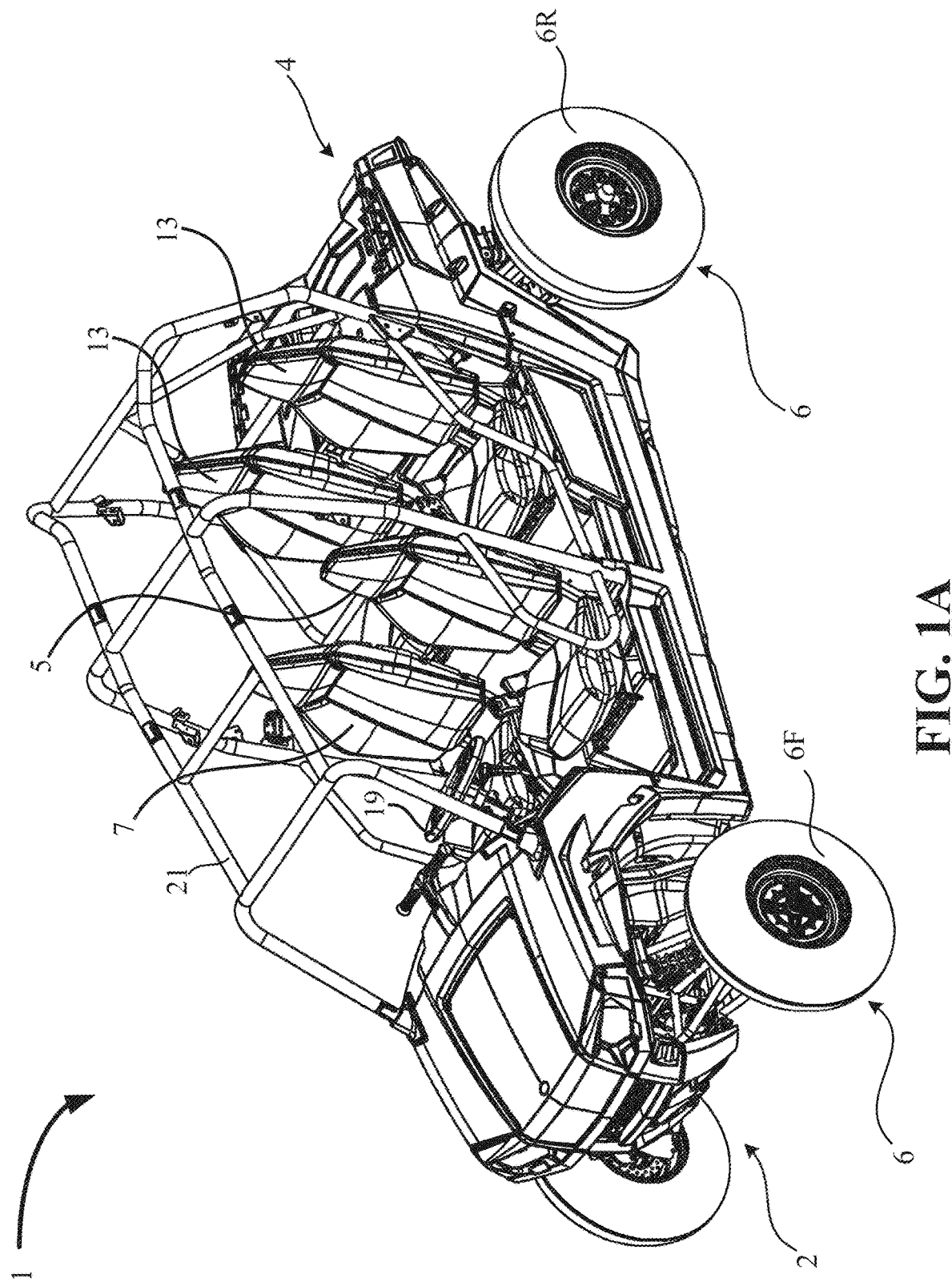
FIG. 1A illustrates a first perspective view of an exemplary vehicle of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates exemplary embodiments of the disclosure, in various forms, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize their teachings.

Figure 1B:
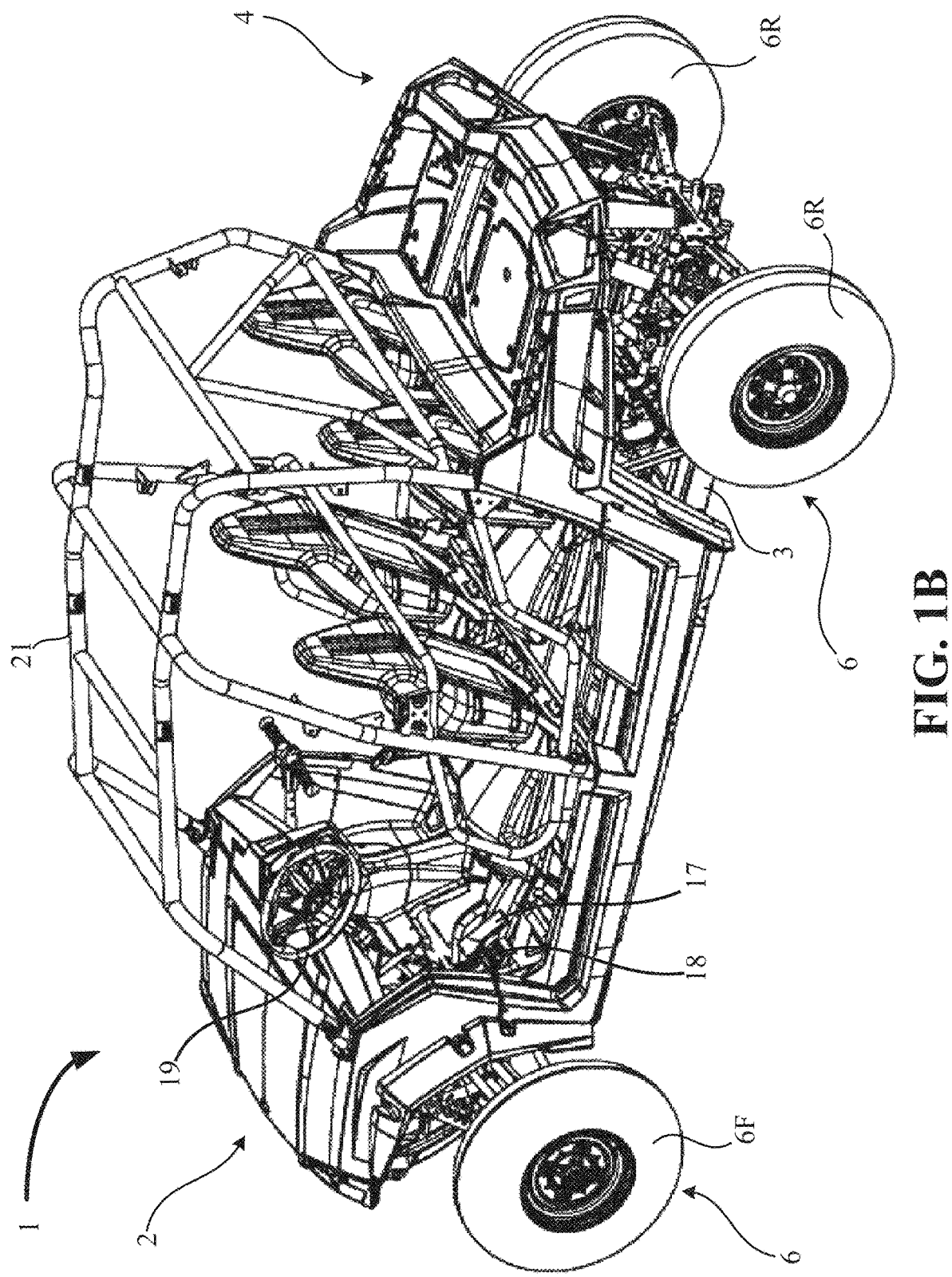
FIG. 1B illustrates another perspective view of the exemplary vehicle of FIG. 1A.

FIGS. 1A and 1B illustrate various perspective views of vehicle 1 having a front portion 2 and a rear portion 4. Vehicle 1 may include side-by side seating as shown with driver's-seat 5 and front passenger seat 7 and also with rear passenger seats 13 supported by chassis or frame 3 and protected by a roll cage 21. The frame is not particularly limited and may be any conventional frame or any frame developed hereafter capable for packaging and mounting purposes. For example, suitable frames include chassis capable of handling two independent drivetrains and, in some embodiments, in substantially similar ways.

Frame 3 may be supported by at least one front ground engaging member 6F and at least one rear ground engaging member 6R, such as wheels 6. Directional operator actuatable input interfaces may include steering wheel 19 and operator actuatable torque input interfaces may include acceleration pedal 17 and brake pedal 18 (both shown in FIG. 1B) to help control movement of vehicle 1.

Figure 1C:
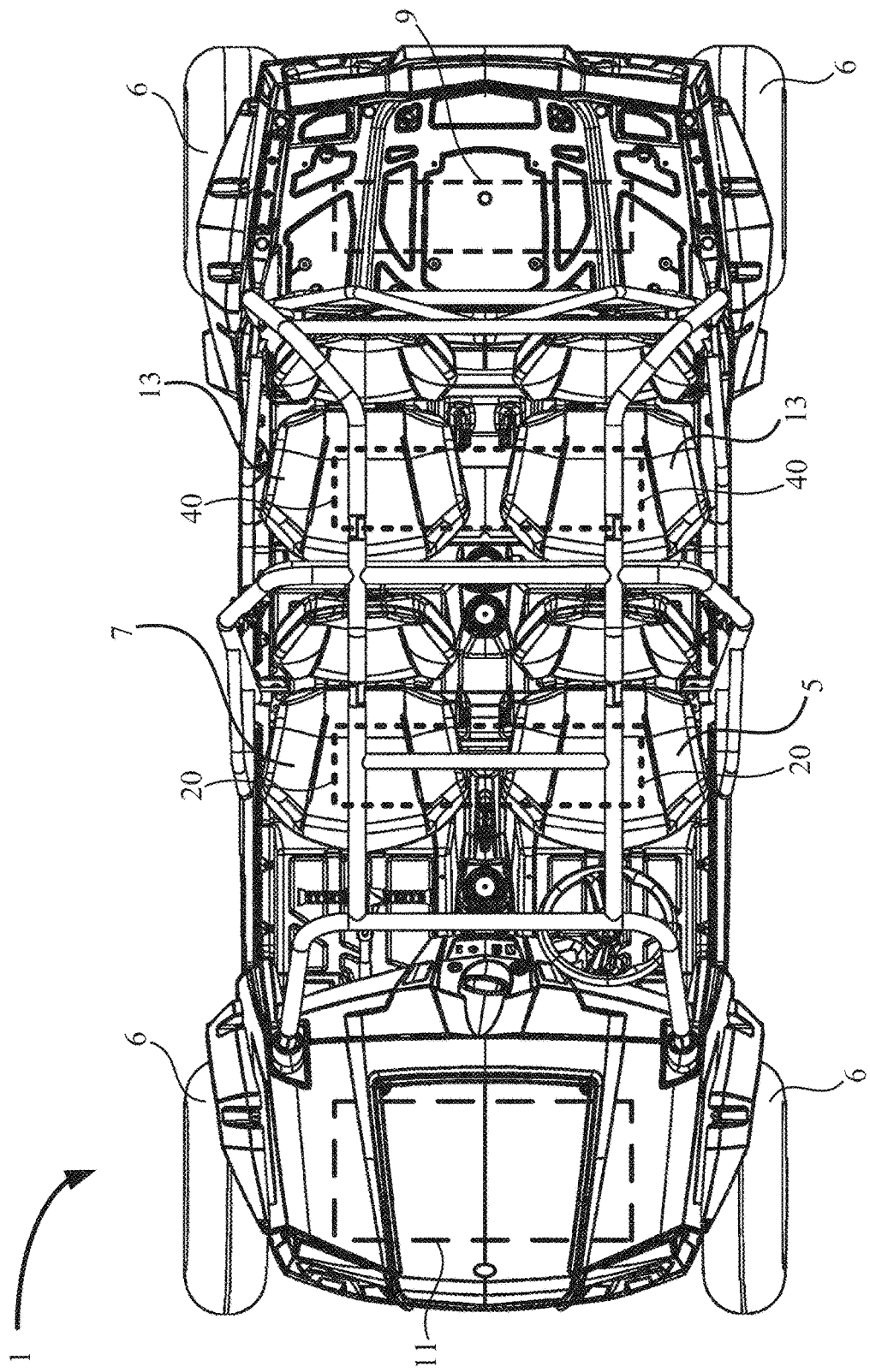
FIG. 1C illustrates yet another perspective view of the exemplary vehicle of FIG. 1A.

FIG. 1C illustrates a top-view of vehicle 1 to further illustrate an exemplary position of various components within vehicle 1 supported by frame 3. Front driveline 11 may be located forward of first power source 20 (exemplified as being below driver's-seat 5 and front passenger seat 7) while rear driveline 9 may be located aft of rear power source 40 (exemplified as being below rear passenger seats 13). Front driveline 11 may be in mechanical communication with the forward ground engaging member 6F through drive shafts or other mechanical connections to power movement of vehicle 1 relative to the ground while rear driveline 9 may be in mechanical communication with rear ground engaging member 6R through drive shafts or other mechanical connections to power movement of vehicle 1 relative to the ground.

Figure 2A:
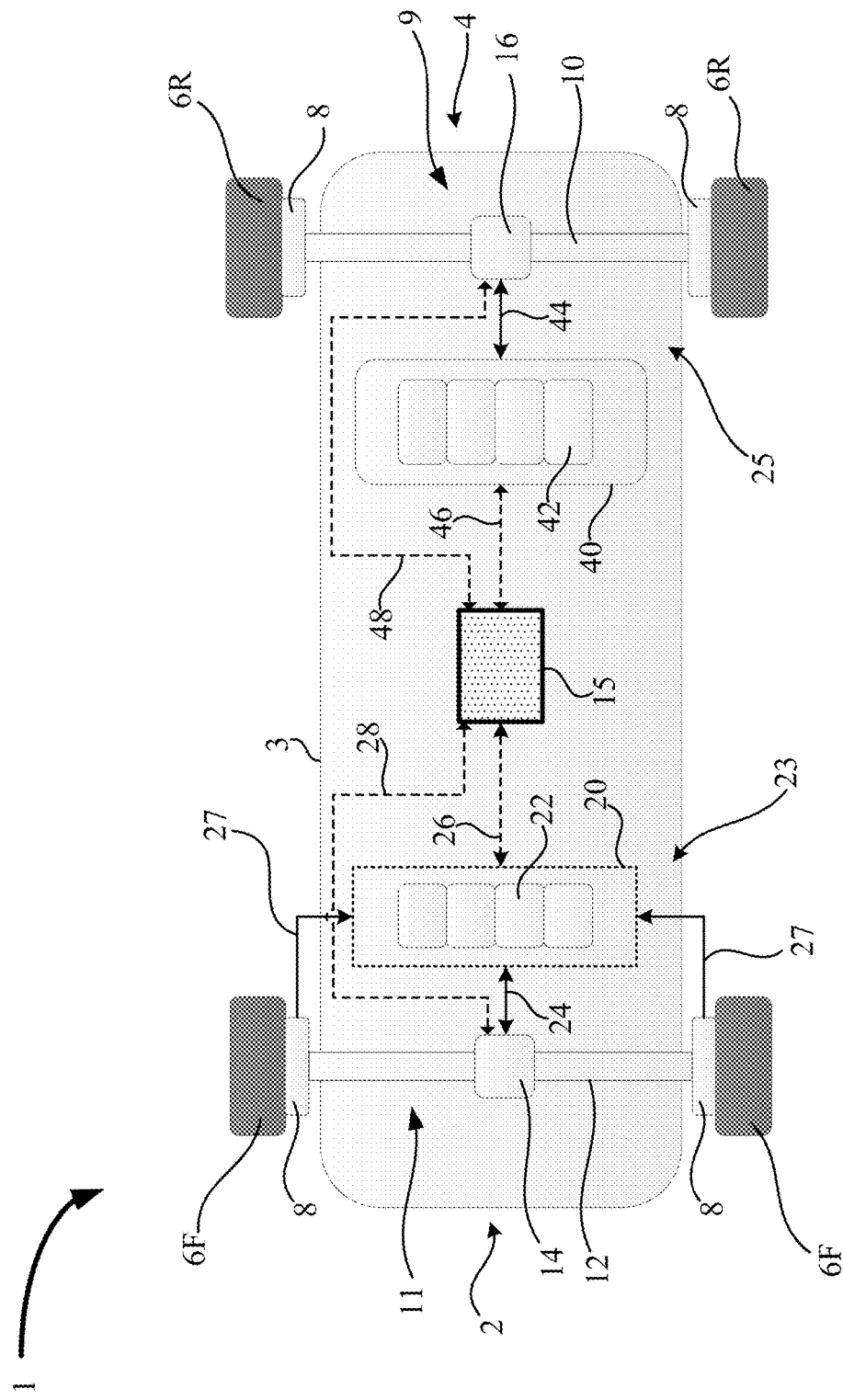
FIG. 2A illustrates an exemplary vehicle of the present disclosure.

FIG. 2A illustrates components of an operational control system of exemplary vehicle 1. Vehicle 1 may include a first drive system 23 supported by the frame 3. First drive system 23 illustratively includes a first power source 20 and a front driveline 11 operatively coupled to first power source 20 and at least one front ground engaging member (illustrated as wheels 6F). Front driveline 11 communicates power from first power source 20 to at least one front ground engaging member 6F.

Similarly, second drive system 25 may include a second power source 40 supported by the frame 3 and a rear driveline 9 operatively coupled to second power source 40 and at least one rear ground engaging member 6R. Rear driveline 9 communicates power from second power source 40 to at least one rear ground engaging member 6R.

Vehicle 1 may also comprise at least one controller (exemplified as controller 15) operatively coupled to first drive system 23 and second drive system 25. Controller 15 may receive a torque request input from an operator actuatable torque interface adapted to be actuatable by an operator of the vehicle (e.g., from accelerator 17 and/or brake 18 shown in FIG. 1B). The torque request input may provide an indication of a requested torque to the at least one controller 15. Controller 15 may be configured to—based on a requested torque—command a first output of first drive system 23 for the at least one front ground engaging member 6F and a second output of second drive system 25 for the at least one rear ground engaging member 6R.

Front driveline 11 is operatively coupled to first power source 20. Rear driveline 9 operatively coupled to second power source 40. Controller 15 (e.g., a vehicular control unit or VCU) may be in electrical communication with front driveline 11, first power source 20, rear driveline 9, and second power source 40. For example, as illustrated in FIG. 2A, controller 15 may be in electrical communication with first power source 20 via first power source-controller connection 26. Similarly, controller 15 may be in electrical communication with second power source 40 via second power source-controller connection 46. Controller 15 may be configured to control front driveline 11 and rear driveline 9 using only power from first power source 20 and second power source 40, respectively.

First power source 20 and second power source 40 provide power to front driveline 11 and rear driveline 9, respectively. In one embodiment, first power source 20 exclusively provides power to one of the front driveline 11 and rear driveline 9 while second power source exclusively provides power to the other of the front driveline 11 and rear driveline 9. Exemplary power sources include batteries, capacitors, and other energy storage devices. For example in various embodiments, first power source 20 is an electrical power source with electrical power provided by a first power storage system, exemplified as a first battery bank comprising a plurality of batteries, such as battery 22 (illustratively one of four batteries in FIG. 2A). Similarly, second power source 40 is an electrical power source with electrical power provided by a second power storage system, exemplified as a second battery bank comprising a plurality of batteries, such as rear battery 42 (illustratively one of four batteries in FIG. 2A). In various embodiments, a battery cell type of the first battery bank is distinct from the second battery bank. In other words, first battery 22 and second battery 42 utilize different structures for storing charge, such as different battery chemistries. Exemplary battery chemistries include lithium-ion, nickel metal hydride, lead-acid, and other suitable chemistries.

As used herein, the term "power storage system" is not particularly limited and may include any power storage system capable of accumulating energy from a form that is more difficult to store to a form that is more conveniently or more economically storable. Exemplary power storage systems include batteries (electrochemical cells), chemical cells (e.g., hydrogen fuel cells, hydrogen peroxide cells), capacitors, and superconducting magnetic energy storage (SMES) systems.

As used herein, the term "battery" or "battery bank" is not limited to a particular type and may include any suitable type of electrochemical cells. Exemplary suitable electrochemical cells may include cells with varying chemical processes and designs, including galvanic cells, electrolytic cells, fuel cells, flow cells, supercapacitors and voltaic piles. For example, suitable batteries may include lead-acid batteries and lithium-ion batteries.

For example, in various embodiments, the battery cell type of the first battery bank is lithium-ion batteries and the battery type of the second battery bank is lead-acid batteries. In various aspects, the varying of the chemistries of the first battery bank and the second battery bank allows for vehicle 1 to have the advantages of multiple battery types. For instance, by having multiple battery types vehicle 1 may allow for more precise control and regenerative charging of the vehicle's power source, while maintaining sufficient torque output and minimizing total battery bank financial costs.

Referring to FIG. 2A, vehicle 1 illustrates brakes 8 associated with wheels 6. In various embodiments, at least a portion of brakes 8 are configured to recover energy from a braking of vehicle 1 and to electrically provide the recovered energy to first power source 20 via regenerative braking connection 27. Further or alternatively, vehicle 1 may include electric motors, illustratively front electric motor 14 and rear electric motor 16, which may be configured to recover energy during a slowing of vehicle 1.

The control strategies disclosed herein may be used with electric motors and may combine four functions to help provide torque to drivetrains and help recover energy through regenerative braking or recuperation. The four functions include providing energy to recharge at least one of first power source 20 and second power source 40 during braking, imparting torque to at least one of front driveline 11 and rear driveline 9, allow at least one of front driveline 11 and rear driveline 9 to coast, and reduce jolting during acceleration. One suitable electric motor is the 48 V boost recuperation machine commercially available from the Robert Bosch GMBH, a registered German corporation located at Postfach 30 02, 40 70442 Stuttgart, Germany. Front electric motor 14 is shown being coupled to power source 20 through electrical connection 24 and may provide recovered energy from braking to power source 20 through front electrical connection 24.

Thus, in some embodiments, front electric motor 14 may provide a source of regenerative braking for first power source 20. In various embodiments, some advantages, amongst others, of using an electric motor may include reduced weight and complexity of the various drivelines.

For example, in some embodiments, front electric motor 14 may be air cooled and, thus, no additional cooling system is required.

Figure 2B:
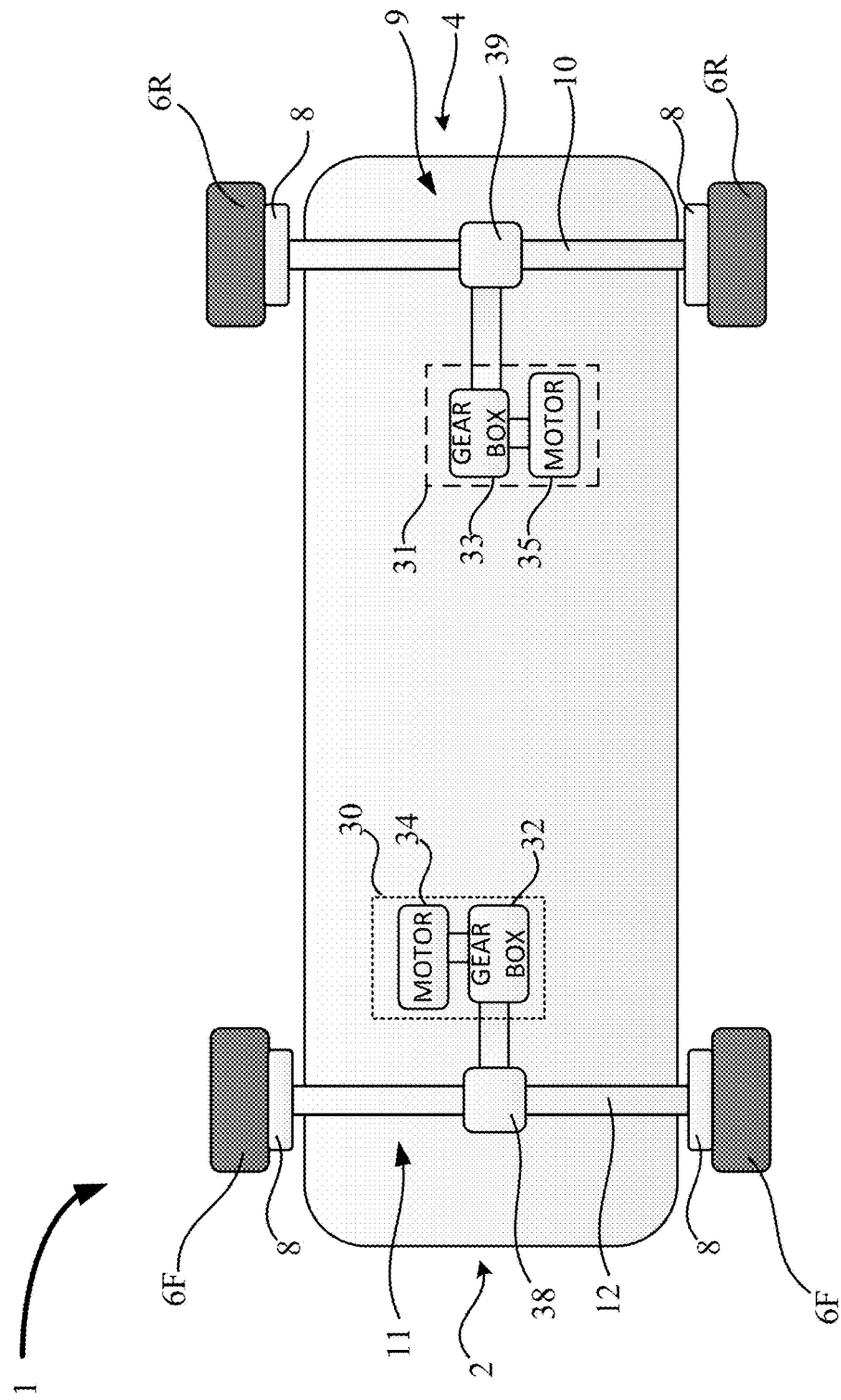
FIG. 2B illustrate an exemplary vehicle of the present disclosure.

FIG. 2B illustrates vehicle 1 with forward powertrain 30. Powertrain 30 may comprise forward motor 34 in mechanical communication with forward gear box 32 and forward differential 38. Rear powertrain 31 may include rear motor 35 in mechanical communication with rear gear box 33, which may be in mechanical communication with differential 39. In one embodiment, both of forward motor 34 and rear motor 35 are electric motors, such as electric motors 14 and 16 powered by first power source 20 and second power source 40, respectively.

In various embodiments, the regenerative braking may be controlled by controller 15. As explained herein, controller 15 controls the operation of vehicle 1 and performs various tasks. Embodiments of controller 15 may be implemented in hardware, software, firmware, and/or a combination thereof. Further, controller 15 may include any suitable processing device or devices operative to execute the software/firmware stored in memory (not shown). For example, controller 15 may include one or more programmable processors (e.g., central processing unit (CPU) devices), application-specific integrated circuits (ASICs), field-programmable gate arrays (FPGAs), digital signal processors (DSPs), hardwired logic, or combinations thereof. Programming code according to the embodiments can be implemented in any viable programming language such as C, C++, XTML, JAVA or any other viable high-level programming language, or a combination of a high-level programming language and a lower level programming language.

In some embodiments, controller 15 determines an optimized forward torque for front drivetrain 11 and/or an optimized rear torque for rear drivetrain 9 based on at least one of a total torque command or a speed of the vehicle. In some embodiments, controller 15 determines at least one of the optimized forward torque or the optimized rear torque based on a state of charge of at least one of the first power source or the second power source. Further, in some embodiments, controller 15 may determine at least one of the forward torque or the rear torque based on a braking command. As used herein the term "optimized" relates to an improvement, but not necessarily the highest degree of improvement.

Similarly, in some embodiments, the controller 15 include a low-pass filter to filter out small variations in the applied torque to the front drivetrain 11 and the rear drivetrain 9. In some aspects, the use of a low-pass filter may prevent jolting and/or torque spikes. Furthermore, in some embodiments, the use of a low-pass filter may also improve the user control of the vehicle.

Figure 3A:
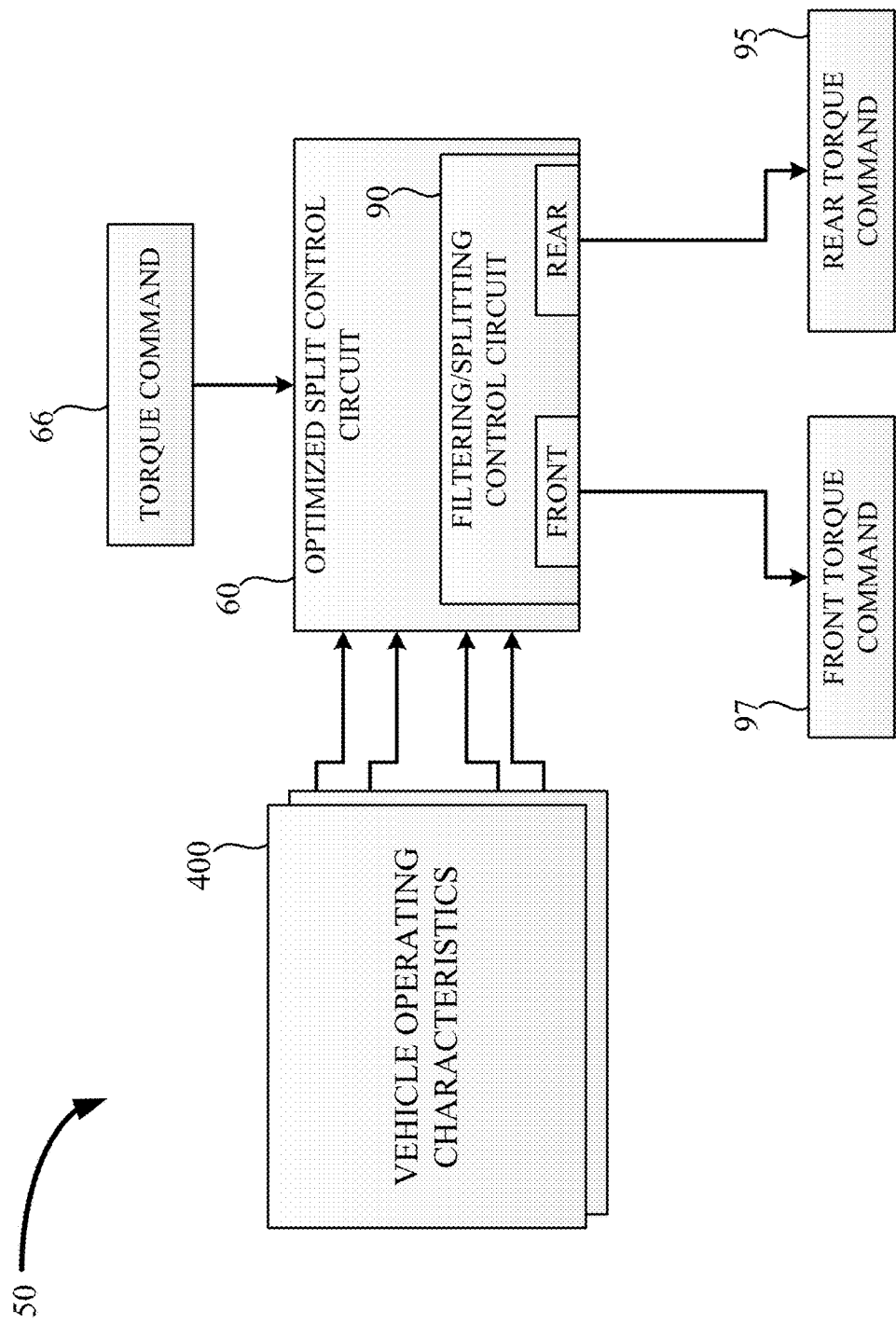
FIG. 3A illustrates an operation of a drive control system of the present disclosure.

FIG. 3A shows an operation of a drive control system 50. Drive control system 50 receives a torque input request command 66 and at least one vehicle characteristic 400. The drive control system 50 may then determine an optimized torque with controller 15, illustrated as optimized split control circuit 60 of controller 15. The total torque requested in torque input request command 66 may then be split between a first torque output command 97 to a first power system, such as first drive system 23, to provide a first torque output, and a second torque output command 95 to a second power system, such as second drive system 25, to provide a second torque output.

Figure 3B:
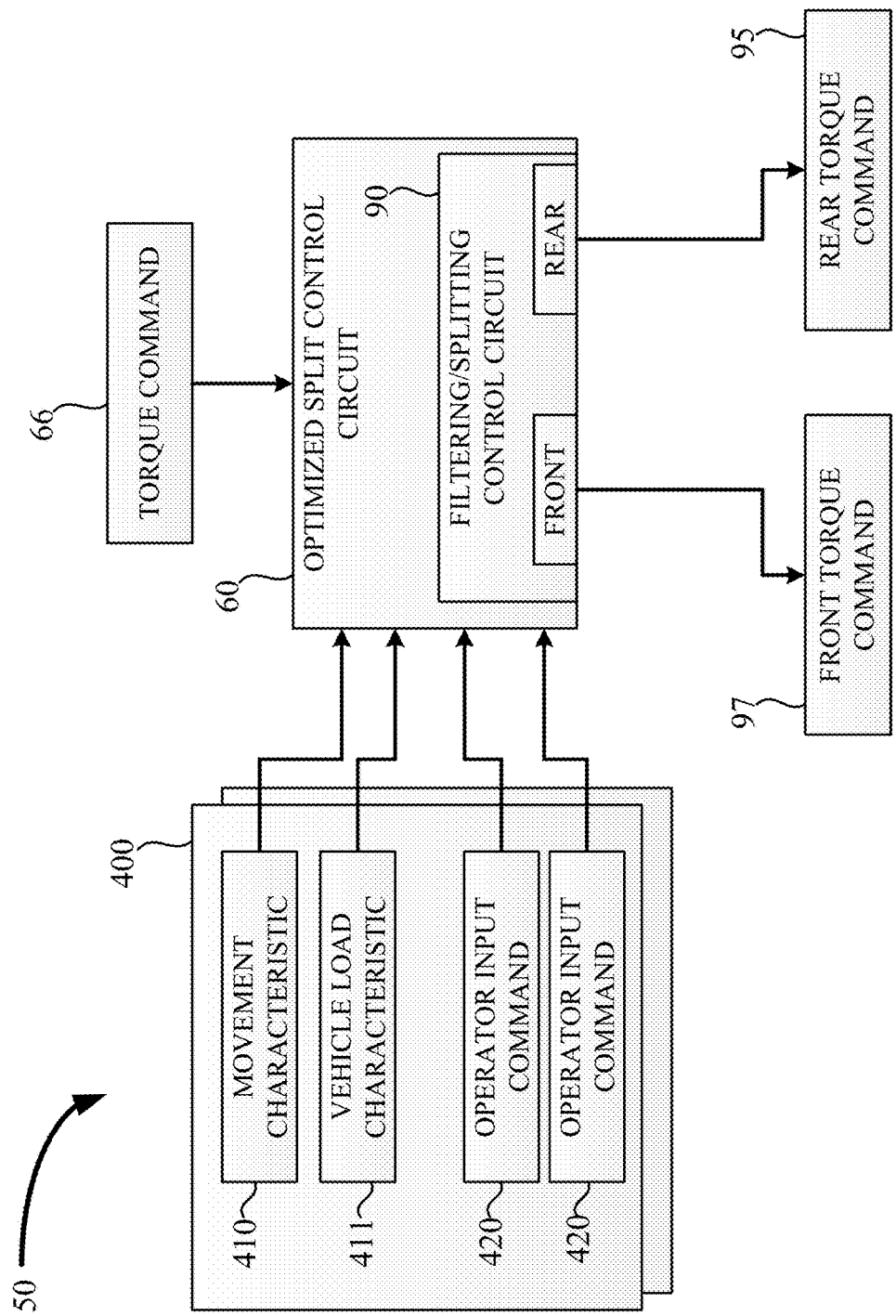
FIG. 3B illustrates an operation of a drive control system based on movement characteristics of a vehicle and operator input commands.

In one embodiment, at least one vehicle operating characteristic 400 may be selected from a vehicle movement characteristic, a vehicle load characteristic or an operator input command and used with the torque input command 66 to determine a front torque command 97 and a rear torque command 95 by the optimized split control circuit 60. Exemplary vehicle movement characteristics include vehicle speed, electric motor speed, state of charge of battery system, and other suitable characteristics. Exemplary vehicle load characteristics include vehicle weight, electric motor operating ranges, and other suitable characteristics. Exemplary operator input commands include changes in the position of the accelerator pedal 17, changes in the position of brake pedal 18, drive mode input position, drivetrain/gear selection input, traction control selection input, and other suitable characteristics. FIG. 3B shows an exemplary embodiment where a movement characteristic 410, a vehicle load characteristic 411 and multiple operator input commands 420 are provided to the optimized split control circuit 60 along with torque input command 66 to determine a front torque command 97 and a rear torque command 95.

Figure 3C:
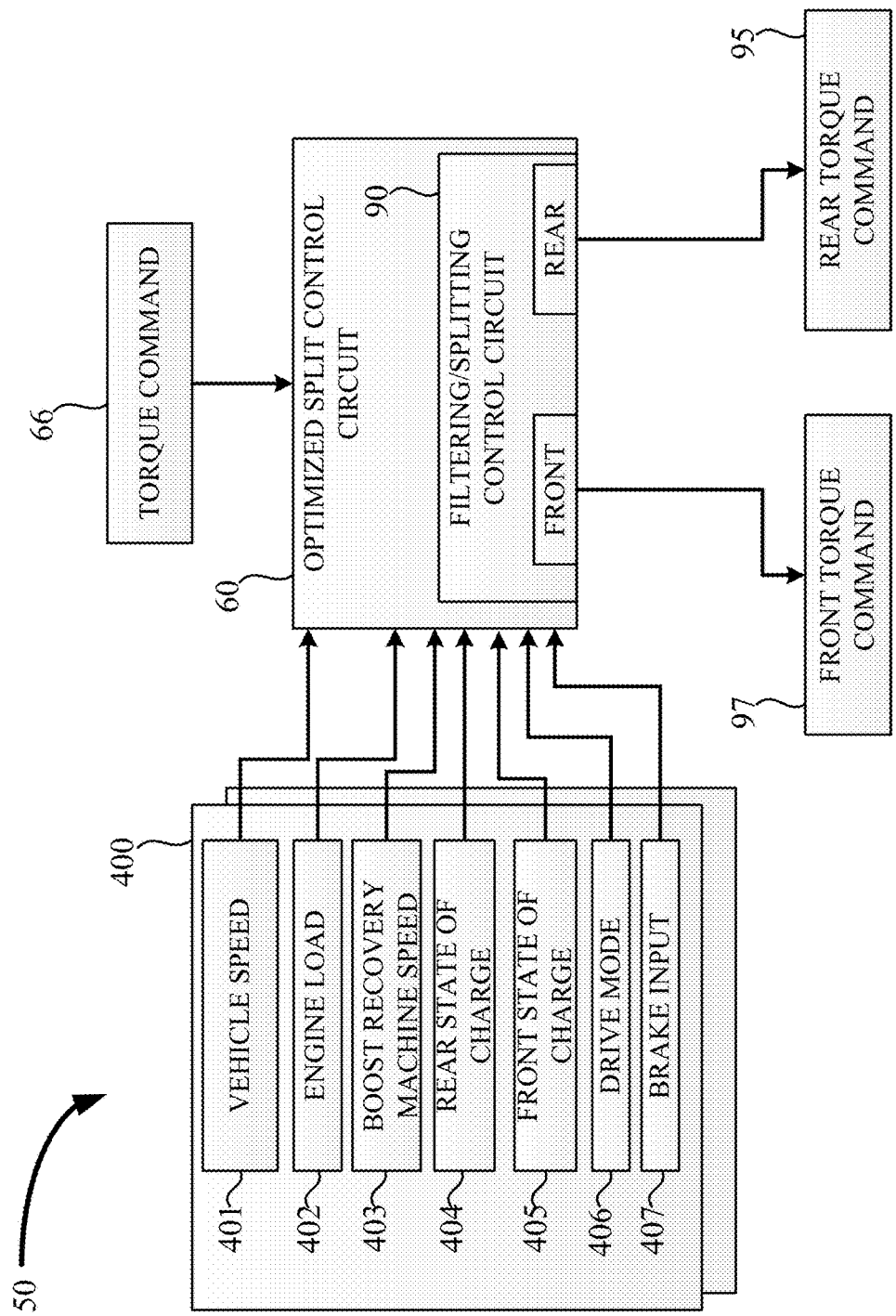
FIG. 3C illustrates an operation of a drive control system based on movement characteristics of a vehicle and operator input commands such as vehicle speed, engine load, electric motor speed, states of charge, drive mode, and braking input.

FIG. 3C illustrates an exemplary embodiment where the optimized split control circuit 60 determines a front torque command torque command 95 and a rear torque command 97 based on torque input command 66, a vehicle speed 401, an engine load 402, an electric motor speed 403, a state of charge 404 of a rear battery bank being used as second power source 40, a state of charge 405 of a front battery bank being used as first power source 20, a drive mode input 406, and a brake input 407. The brake input 407 may be used by a filtering/splitting control circuit 90 of optimized split control circuit 60 to determine whether a braking command or a torque increase command should be given as front torque command 97 and rear torque command 95.

Figure 3D:
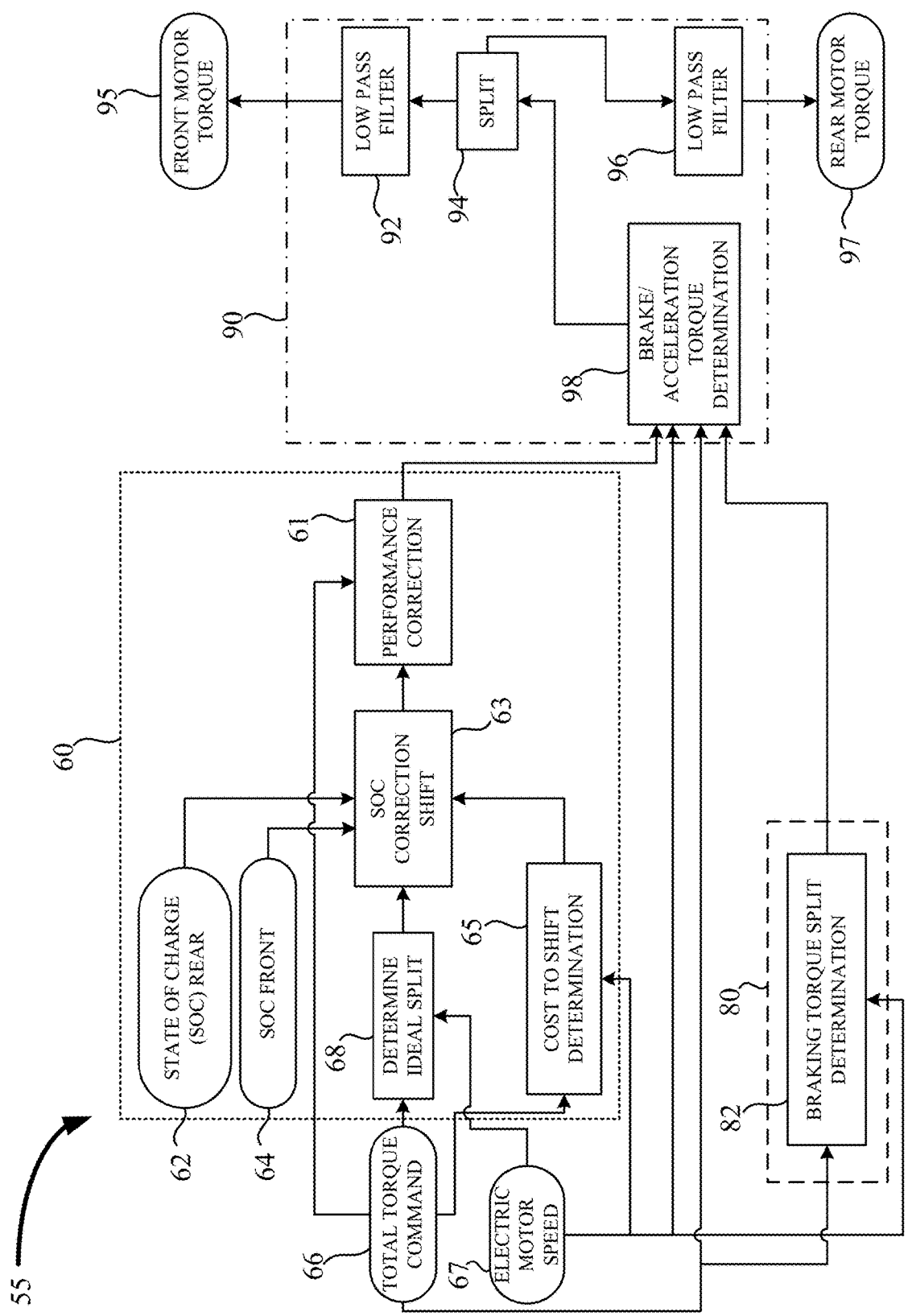
FIG. 3D illustrates an exemplary processing sequence of a drive control system of vehicle of the present disclosure.

FIG. 3D illustrates an exemplary processing sequence 55 of the optimized split control circuit 60 to determine split torque commands of a vehicle, such as vehicle 1. Split torque command processing sequence 55 may include receiving a torque input command 66 and a signal indicating a speed of a vehicle, such as the front electric motor speed 67 from front electric motor 14.

Optimized split control circuit 60 determines an ideal split 68 of a requested torque into a front torque output command and a rear torque output command based on a total torque command 66 and an electric motor speed 67. The front torque output command is for the front drive system 23 and the rear torque output command is for the rear drive system 25. In some embodiments, the ideal split is determined based on the minimization of the total losses for the entire vehicle driving system at a given operating condition (e.g., speed of the vehicle). This determination may include both the electric motor losses and the battery losses for both the front and rear electric motors 14, 16 of the vehicle 1 at a given total torque demand. Thus, the total system loss at a given torque may be provided as the sum of the (i) front electric motor losses, (ii) the rear electric motor losses, (iii) the front battery losses, (iv) the rear battery losses, and (v) losses associated with any mechanical linkages to the ground engaging members at the given torque.

Because electric motor losses at a given torque and speed can be analyzed and measured, their losses may be determined using an efficiency map of the motor. The battery losses at a given torque and speed can be determined by calculating the power to be requested by the electric motor at the expected operating point of the electric motor and then based on that expected power draw, the expected battery loss. In one example, the battery may be modeled as an ideal voltage source in series with an internal resister. Using this model, the following equation may be used to determine or approximate the battery loss:

$$P_{loss} = \frac{V_{OC} - \sqrt{V_{OC}^2 - 4*R_{in}*P_{req}}}{4*R_{in}},$$

where $P_{loss}$ is the power loss, $P_{req}$ is the power required or demand, $V_{OC}$ is the voltage at the operating condition, and $R_{in}$ is the input resistance.

Using the aforementioned equation and an efficiency map, a look-up table may be created for all possible electric motor speed and requested torque combinations. For each requested torque input and measure vehicle speed (electric motor speed), the look-up table may provide the (i) front electric motor losses, (ii) the rear electric motor losses, (iii) the front battery losses, and (iv) the rear battery losses from which the ideal split may be determined. For example, optimized split control circuit 60 may sum the retrieved losses and select the split that provides the minimum loss. Alternatively, the look-up table may provide for each requested torque input and measured vehicle speed (electric motor speed), the ideal split for the front torque output command and the rear torque output command. For example, the look-up table for a first given requested torque and a first measured vehicle speed may provide a split of 60% front torque command/40% rear torque command which provides the lowest system losses for the first given requested torque and the first measured vehicle speed and for a second given requested torque and the first measure vehicle speed a split of 45% front torque command/55% rear torque command which provides the lowest system losses for the second given requested torque and the first measured vehicle speed. While the split values can range from 0% to 100%, in some combinations, the split values could range from a torque split of the front torque being about 20% to about 80% of the total torque output command, about 40% to about 80% of the total torque output command, about 40% to about 60% of the total torque output command, or about 60% to about 80% of the total torque output command. In one example the ideal split 68 is set at a constant value for all possible electric motor speeds and requested torque inputs. In one example, the constant value is about 54%.

In the illustrated processing sequence 55, the determined split value for the front torque output command and the rear torque output command determined by ideal split 68 may be modified by the SOC correction shift 63. Based on a state of charge (SOC) of a first power source 62 (power source 20), a SOC of a second power source 64 (power source 40), the determined split value from ideal split 68, and a cost to shift determination 65, optimized ideal split control circuit 60 may make a SOC correction shift 63.

In one embodiment, SOC correction shift 63 shifts the torque split point to prevent drain of one of the two battery systems 22 and 42 (see FIG. 2A). In one embodiment, SOC correction shift shifts the torque split point to intentionally drain batteries 22. One reason for this, when batteries 22 are lithium-ion batteries and batteries 42 are lead-acid batteries, is that lithium-ion batteries are able to handle a larger in-rush of current than lead-acid batteries. Thus, batteries 22 are better suited to receive energy recovered through regenerative braking than batteries 42. In order to maximize the ability to use recovered energy for recharging the batteries of vehicle 1, batteries 22 should have a state-of-charge level to receive the recovered energy. However, shifting away from the ideal split results is additional energy losses.

Optimized split control circuit 60 thus looks at the cost, additional energy loss, for shifting from the determined ideal split point 68.

The cost to shift determination 63, in one embodiment, is the cost or power loss to shift torque split point from the ideal split based on the current operating conditions. Similar to the ideal split determination, determination of the cost to shift may be accomplished by calculating the power loss (e.g., electrical watts) above the power losses at the ideal split for every potential operating point.

Figure 5:
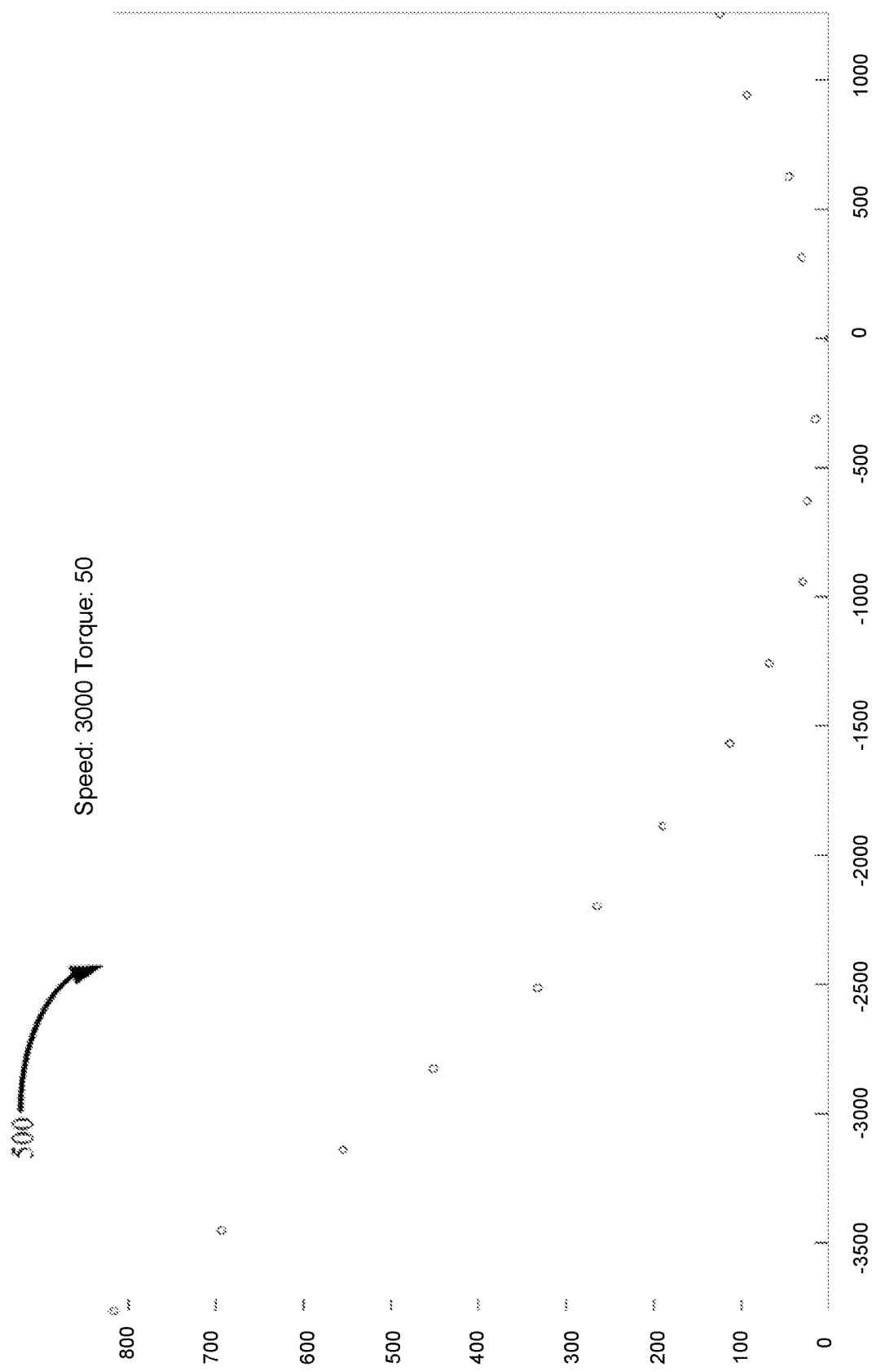
FIG. 5 illustrates an exemplary graph of the cost to shift power from the ideal split according to an embodiment of the disclosure.

The extra electrical watts lost above the ideal split at the operating point per watt shifted was found to roughly fit a curve having the following equation: $y=C*x^2$, where C is a constant at a given speed and torque load. FIG. 5 illustrates a graph 500 including some exemplary cost to shift torque data from optimal according to one embodiment. The data in FIG. 5 corresponds to a speed of 3,000 rpm and a torque of 50 (Nm). The value of constant (C) may be determined by fitting a quadratic function to the illustrated data. The x-axis in FIG. 5 corresponds to the number of Watts to be shifted from the front drive system 23 to the rear drive system 25. The negative values correspond to power shifted from the front drive system 23 to the rear drive system 25 and the positive values correspond to power shifted to the front drive system 23 from the rear drive system 25.

Assuming both batteries 22 and batteries 42 are not fully charged, optimized split control circuit 60 may establish a set point to guide when changes from the ideal split are desired based on a difference in SOC 62 of batteries 42 and SOC 64 of batteries 22. In one embodiment, if the difference is below a first set point then no shifting from ideal is to occur. Further, if the difference is above the first set point then shifting should occur to better balance the charge between batteries 22 and batteries 42. Thus, in various embodiments, controller 15 may alter split between the first torque command and the second torque command based on a charge difference between the forward battery bank 22 and the rear battery bank 42 being greater than a predetermined threshold. While the deviation decision may be binary, the predetermined threshold may be a percent charge difference. In various embodiments, the predetermined threshold may be when the percentage charge difference is greater than about 10%, greater than about 7.5%, or greater than about 5%.

Controller 15 may determine the appropriate amount of torque to shift by combining the degree of difference there is in pack SOC values and the cost to shift determination. The decision to shift torque to rebalance SOC may determined by two set points: the lower set point (e.g., the point at which the control will start to do some shifting, for example, about 2% difference) and the higher set point (e.g., the point above which the control will attempt to shift all of the torque, for example, about a 5% difference). The constant value C found at each operating point provides an indication of the cost to shift at a given operating point. These two factors (SOC difference and C value) may be fed into a 2-input 1-output calibratable map, which may generate the percent of torque to shift from one powertrain to the other. The map may reflect the percentage of torque to shift away from the ideal split, thus, as the C value increases, the controller may be less willing to shift torque when the SOC value is between the two SOC set points. The axes the 2-input 1-output calibratable map may include the normalized difference in the SOC between two set points (x-axis), the C value (y-axis), and the dependent variable axis (z-axis). Exemplary dependent variable axis values include the percentage of torque to shift.

Controller 15 next verifies that the determined split is within the performance limits of the systems of vehicle 1 with a performance correction 61. In one example, controller 15 determines the operating revolutions per minute of front electric motor 14 and rear electric motor 16 to verify that the requested increase in output is within the operating range of front electric motor 14 and rear electric motor 16. If so, then no change is made to the split value. If not, the split value is adjusted to maintain front electric motor 14 and rear electric motor 16 within their respective operating ranges.

Split torque command processing sequence 55 may also contain an electrical braking architecture strategy 80, which may be configured to receive a brake command, determine an optimized braking torque split between the front driveline 11 and the rear driveline 9. In various embodiments, the braking torque split determination may be combined with the total torque demand and may be used as to make a brake/acceleration torque determination 98 that is part of the filtering/splitting architecture 90. In one example, brake/acceleration torque determination 98 may receive a split from optimized split control circuit 60 that is 30% to front electric motor 14, but since the request is a braking request, brake/acceleration torque determination 98 may alter the split to be more to front electric motor 14 to recover additional energy from regenerative braking and charge batteries 22.

In the filtering/splitting architecture 90, the total torque input demand 66 and the braking torque split determination 82 may be received. If the signal of a torque command and the speed of the vehicle (e.g., electric motor speed 67) match then the request may be an accelerating torque. If they do not match then the request may be a braking torque. In some embodiments, around a zero speed point, a transition zone may be implemented to prevent step changes in the split. Within this zone, a linear interpolation between the first section's split and the second section's split may be performed. The size of this zone may be determined by two calibratable labels. After the split is determined, the final torque requests is through low pass filters, one for each motor, immediately before being transmitted to the motors in order to provide acceptable noise, vibration, and harshness (NVH) characteristics.

In additions to systems, various embodiments of methods of managing a plurality of independent battery banks in a vehicle are disclosed herein. Such methods may include receiving, by a controller a forward state of charge of a forward battery bank over a first communication network (such as a control area network), receiving a rear state of charge of a rear battery bank over a second communication network, determining and in response to a torque request, a first torque command and a second torque command, outputting the first torque command over the first communication network, and outputting the second torque command over the second communication network. In various embodiments, the first communication network may be independent of the second communication network or they may form part of the same communication network. The communication network or communication networks may use control area network (CAN) protocol, which may be specified as International Standards Organization standard 11898. The communication network or bus may be a digital system that may use (or form) a single-wire, twisted pair wires, a two-wire connection, a three-wire connection, fiber optic connections or other suitable types of hardware and combinations thereof.

Figure 4:
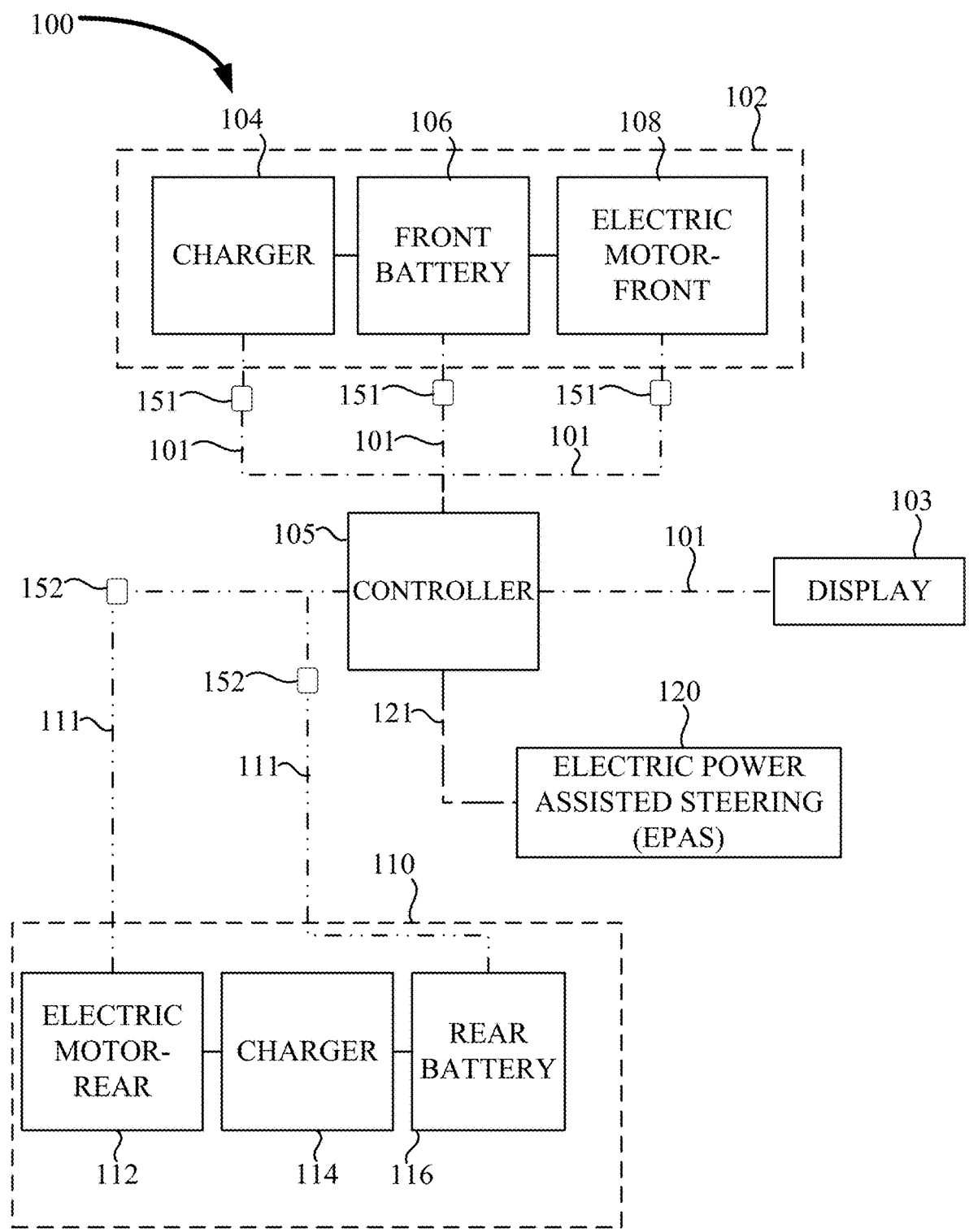
FIG. 4 illustrates an exemplary electrical system of the present disclosure.

FIG. 4 illustrates the electrical architecture of a battery management system according to various embodiments of this disclosure. Battery management system 100 may include a forward battery bank that may include one or more front batteries 106 and a rear battery bank that may include one or more rear batteries 116. In some embodiments, the voltage capacity of the front batteries and the rear batteries may differ and in other embodiments, the voltage capacity may be the same. In various embodiments, the front battery bank and the rear battery bank are electrically independent from each other. Thus, controller 105 (such as a vehicular control unit (VCU)) may independently and separately manage the front battery bank and the rear battery bank. For example, in some embodiments, a first communication network (such as a control area network) 101 may connect the forward battery bank including one or more batteries 106 to controller 105 and a second communication network 111 may connect the rear battery bank including one or more batteries 116 to controller 105. In various embodiments, controller 105 may output a first torque command over first communication network 101 and a second torque command over second communication network 102 in response to a torque request.

Battery management system 100 may also comprise a front power system 102 (e.g., a 48 volt system). Front power system 102 may comprise charger 104, front battery bank including one or more batteries 106, and front electric motor 108. Similarly, battery management system 100 may comprise a rear power system 110. Rear power system 110 may comprise a rear electric motor 112, a charger 114, and rear battery bank including one or more batteries 116.

In addition to being electrically connected to front power system 102 and rear power system 110, controller 105 may be electrically connected to an electric power assisted steering (EPAS) system 120 over third communication network 121. Also, first communication network 101 may also connect a display 103 to the controller 105. Display 103 may be provided on a dash of vehicle 1 and positioned to be observable by an operator of vehicle 1.

As shown in FIG. 4 battery management system may manage the front power system 102 and the rear power system 110. Although front power system 102 and rear power system 110 are each exemplified with a front battery 106 and a rear battery 116, both the front power system 102 and the rear power system 110 may include a plurality of batteries in parallel or in series. This, battery management system may be configured to manage a plurality of independent battery banks in a vehicle. Controller 105 may be configured to receive a forward state of charge of forward battery bank including batteries 106 over a first communication network 101 and receive a rear state of charge of rear battery bank including batteries 116 over a second communication network 102.

Furthermore, controller 105 may be configured to determine—in response to a torque request—a first torque command and a second torque command and output the first torque command over the first communication network 101 and output the second torque command over the second communication network 102. As shown in FIG. 4, the two networks may be electrically independent of the other network, or in other words, the first communication network and the second communication network do not share or directly transfer electricity, but may both be controlled by the same controller 105.

FIG. 4 also illustrates vehicle drive control system for a vehicle having a first power system (front power system 102) and a second power system (rear power system 110). Controller 105 may also be configured to receive a torque input command, receive at least one vehicle characteristic, provide a first torque output command to the first power system (illustrated as front power system 102) to provide a first torque output (via front electric motor 108), and provide a second torque output command to the second power system (rear power system 110) to provide a second torque output (e.g., via rear electric motor 112). In one embodiment, controller 105 may operate in accordance with the discussions herein relative to controller 15 and processing sequence 55.

The drive control system may also comprise a first connector 151 operably coupled to the controller 105 and adapted to be operably coupled to a first communication network 101 connecting the first power system (illustrated as front power system 102) to controller 105. Similarly, a second connector 152 may also be operably coupled to the controller 105 and adapted to be operably coupled to a second communication network 111 connecting the second power system (illustrated as rear power system 110) and controller 105.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A vehicle, comprising:
   a plurality of ground engaging members, including at least one front ground engaging member and at least one rear ground engaging member;
   a frame supported by the plurality of ground engaging members;
   a plurality of electric motors supported by the frame;
   a first drive system supported by the frame, the first drive system including a first power source and a front driveline operatively coupled to the first power source and the at least one front ground engaging member to communicate power from the first power source to the at least one front ground engaging member, wherein the front driveline includes a first electric motor of the plurality of electric motors;
   a second drive system including a second power source supported by the frame and a rear driveline operatively coupled to the second power source and the at least one rear ground engaging member to communicate power from the second power source to the at least one rear ground engaging member, wherein the rear driveline includes a second electric motor of the plurality of electric motors;
   at least one controller operatively coupled to the first drive system and the second drive system; and
   a torque request input adapted to be actuatable by an operator of the vehicle, the torque request input providing an indication of a requested torque to the at least one controller, wherein
      the at least one controller is configured to command a first output of the first drive system to the at least one front ground engaging member and a second output of the second drive system to the at least one rear ground engaging member based on the requested torque command and an operating characteristic of at least one of the plurality of electric motors,
      the first power source is a first battery bank and provides power to one of the front driveline and the rear driveline, and the second power source is a second battery bank and provides power to the other of the front driveline and the rear driveline.

2. The vehicle of claim 1, wherein a battery cell type of the first battery bank has a different chemical composition from the second battery bank.

3. The vehicle of claim 2, wherein the battery cell type of the first battery bank is lithium-ion.

4. The vehicle of claim 3, wherein the battery cell type of the second battery bank is lead-acid.

5. The vehicle of claim 2, wherein the battery cell type of the second battery bank is lead-acid.

6. The vehicle of claim 1, further comprising a front brake operatively coupled to the first power source, wherein the front brake is configured to charge the first power source with energy produced through regenerative braking.

7. The vehicle of claim 1, wherein the at least one controller determines the first output of the first drive system and the second output of the second drive system based on at least one of a total torque command or a speed of the vehicle.

8. The vehicle of claim 7, wherein the at least one controller determines the first output of the first drive system and the second output of the second drive system further based on a state of charge of at least one of the first power source or the second power source.

9. The vehicle of claim 8, wherein the at least one controller determines the first output of the first drive system and the second output of the second drive system based on a braking command.

10. The vehicle of claim 8, wherein the at least one controller determines the first output of the first drive system and the second output of the second drive system based on an electrical capacity of the first drive system.

11. The vehicle of claim 1, wherein the at least one controller comprises part of a vehicle drive control system and the at least one controller is configured to
receive a torque input command,
receive at least one vehicle characteristic,
provide a first torque output command to the first drive system to provide a first torque output, and
provide a second torque output command to the second drive system to provide a second torque output;
a first connector operably coupled to the at least one controller and adapted to be operably coupled to a communication network connecting the first drive system to the at least one controller; and
a second connector operably coupled to the at least one controller and adapted to be operably coupled to the communication network connecting the second drive system and the at least one controller.

12. The vehicle of claim 11, wherein the at least one controller comprises a low-pass filter configured to alter at least one of the first torque output command or the second torque output command.

13. The vehicle of claim 11, wherein the first torque output command and the second torque output command are determined to minimize a loss of power between based on the first power source, the second power source, a travel surface, the first drive system, and the second drive system.

14. The vehicle drive control system of claim 11, wherein the first torque output command is between about 20% to about 80% of a total torque output command comprising the first torque output command and the second torque output command.

15. A vehicle drive control system for a vehicle having a first drive system including a first battery bank and a second drive system including a second battery bank, comprising:
at least one controller configured to:
receive a torque input command;
receive at least one vehicle characteristic;
provide a first torque output command to the first drive system to provide a first torque output;
provide a second torque output command to the second drive system to provide a second torque output;
receive an indication of a state of charge of the first battery bank of the first drive system and an indication of a state of charge of the second battery bank of the second drive system;
determine a charge difference between the state of charge of the first battery bank and the state of charge of the second battery bank; and
alter, based on the determined charge difference being greater than a predetermined threshold, at least one of: the first torque output command and the second torque output command;
a first connector operably coupled to the at least one controller and adapted to be operably coupled to a first communication network connecting the first drive system to the at least one controller; and
a second connector operably coupled to the at least one controller and adapted to be operably coupled to a second communication network connecting the second drive system and the at least one controller.

16. The vehicle drive control system of claim 15, wherein the predetermined threshold is a percent charge difference.

17. The vehicle drive control system of claim 16, wherein the predetermined threshold is greater than about 10%.

18. The vehicle drive control system of claim 17, wherein the predetermined threshold is greater than about 7.5%.

19. The vehicle drive control system of claim 18, wherein the predetermined threshold is greater than about 5%.

20. The vehicle drive control system of claim 15, wherein the at least one controller is configured to receive the torque input command from at least one of an accelerator pedal or a brake pedal.

21. The vehicle drive control system of claim 15, wherein the at least one controller comprises a low-pass filter configured to alter at least one of the first torque output command or the second torque output command.

22. The vehicle drive control system of claim 15, wherein the first torque output command is between about 20% to about 80% of a total torque output command comprising the first torque output command and the second torque output command.

23. The vehicle drive control system of claim 15, wherein the first torque output command is between about 20% to about 60% of a total torque output command.

24. The vehicle drive control system of claim 15, wherein the first torque output command is between about 40% to about 80% of a total torque output command.

25. The vehicle drive control system of claim 15, wherein the first torque output command is between about 40% to about 60% of a total torque output command.

26. The vehicle drive control system of claim 15, wherein the first torque output command is between about 50% to about 60% of a total torque output command.

27. The vehicle drive control system of claim 15, wherein the first torque output command is about 54% of a total torque output command.

28. The vehicle drive control system of claim 15, wherein the first torque output command and the second torque output command are determined to minimize a loss of power between the first battery bank, the second battery bank, and a travel surface.

29. A vehicle comprising the vehicle drive control system of claim 15.

30. The vehicle of claim 29, wherein the first drive system of the vehicle further includes a front driveline operatively coupled to the first battery bank; the second drive system of the vehicle further includes a rear driveline operatively coupled to the second battery bank; the at least one controller is in electrical communication with the first drive system and the second drive system; and the front driveline and the first battery bank are independent of the rear driveline and the second battery bank.

31. The vehicle of claim 30, wherein the first battery bank includes a plurality of lithium-ion batteries and the second battery bank includes a plurality of lead-acid batteries.

32. The vehicle of claim 30, wherein the first battery bank includes a plurality of lithium-ion batteries.

33. The vehicle of claim 30, wherein the second battery bank includes a plurality of lead-acid batteries.

34. A method of controlling a torque output of a vehicle having a front driveline coupled to at least one front ground engaging member and a rear driveline coupled to at least one rear ground engaging member, comprising:
receiving a torque request command and a signal indicating a speed of an electric motor;

determining, by at least one controller, a front torque output for the front driveline and a rear torque output for the rear driveline based on the torque request command and the speed of the electric motor;

controlling, by the at least one controller, an electrical output of a first power storage system based on the front torque output for the front driveline;

supplying the electrical output of the first power storage system to one of the front driveline and the rear driveline;

controlling, by the at least one controller, an electrical output of a second power storage system based on the rear torque output for the rear driveline; and supplying the electrical output of the second power storage system to the other of the front driveline and the rear driveline.

35. The method of controlling a torque output of claim 34, further comprising:

receiving a brake command;

determining, by the at least one controller, a braking torque split between the front driveline and the rear driveline;

controlling a front braking of the front driveline.

36. The method of claim 35, wherein the step of determining, by the at least one controller, the front torque output for the front driveline and the rear torque output for the rear driveline includes the steps of:

determining a first front torque output and a first rear torque output to reduce power loss by at least one of the front driveline, the rear driveline, the first power storage system, the second power storage system or mechanical power losses;

receiving a state of charge of the first power storage system and a state of charge of the second power storage system; and determining a second front torque output and a second rear torque output based on the state of charge of the first power storage system, the state of charge of the second power storage system; a power loss cost associated with operating the first power storage system and the front driveline at the second front torque output instead of the first front torque output, and a power loss cost associated with operating the second power storage system and the rear driveline at the second rear torque output instead of the first rear torque output.

37. The method of claim 34, further comprising controlling a front braking of the front driveline.

38. The method of claim 35, further comprising recharging the first power storage system with regenerative braking while controlling the front braking of the front driveline.

39. The method of claim 35, wherein the first power storage system is a first battery bank and the second power storage system is a second battery bank.

40. The vehicle of claim 1, wherein the first power source and the front driveline are independent of the second power source and the rear driveline.

41. The vehicle of claim 1, wherein the first battery bank is operatively coupled to only one of the front driveline and the rear driveline.

42. The vehicle of claim 1, wherein the operating characteristic of at least one of the plurality of electric motors is an electric motor speed of the at least one of the plurality of electric motors.

* * * * *